(12) United States Patent
Ullrich et al.

(10) Patent No.: US 6,182,997 B1
(45) Date of Patent: Feb. 6, 2001

(54) TRAILER HITCH ASSEMBLY

(75) Inventors: Daniel J. Ullrich, Chicago; J. William Giffune, Downers Grove, both of IL (US)

(73) Assignee: EZ Tow Corporation, Downers Grove, IL (US)

(*) Notice: Under 35 U.S.C. 154(b), the term of this patent shall be extended for 0 days.

(21) Appl. No.: 09/400,615

(22) Filed: Sep. 20, 1999

(51) Int. Cl.[7] .......................................... B60D 1/04
(52) U.S. Cl. ................... 280/476.1; 280/405.1; 280/767
(58) Field of Search ................ 280/476.1, 475, 280/405.1, 763.1, 764.1, 765.1, 766.1, 767

(56) References Cited

U.S. PATENT DOCUMENTS

| | | |
|---|---|---|
| 2,463,926 * | 3/1949 | Ward . |
| 2,523,211 * | 9/1950 | Hedgpeth . |
| 3,281,161 * | 10/1966 | Anderson . |
| 3,715,132 * | 2/1973 | Denny . |
| 4,168,082 * | 9/1979 | Hendrickson ................ 280/405.1 |
| 5,785,330 * | 7/1998 | Shoquist ...................... 280/81.6 |

* cited by examiner

*Primary Examiner*—Kevin Hurley
(74) *Attorney, Agent, or Firm*—Marshall, O'Toole, Gerstein, Murray & Borun (57) ABSTRACT

Towing apparatus for connecting a trailer with a towing vehicle. The towing apparatus is adapted to bear part of the weight of the trailer, thus lessening the load on the towing vehicle. This is accomplished by providing a wheel assembly on the towing apparatus which is operatively connected to an adjustable main spring which supports most of the weight of the trailer which would normally bear on the hitch of the towing vehicle. Unlike conventional towing systems, wherein the trailer tongue is rigidly attached to the trailer, the towing apparatus of the present invention employs a pivotally-mounted trailer tongue which is maintained in a horizontal position by an adjustable secondary spring or springs. The use of main and secondary springs presents a relatively constant load to the trailer hitch, even when the trailer is being towed across rough or uneven surfaces.

16 Claims, 9 Drawing Sheets

TRAILER HITCH ASSEMBLY

BACKGROUND OF THE INVENTION

A. Field of the Invention

The present invention relates to hitch assemblies for connecting a trailer to a towing vehicle. In addition to interconnecting the trailer and the towing vehicle, the towing apparatus or hitch assemblies support the front end of the trailer. The novel towing apparatus disclosed herein incorporates a wheel or set of wheels which can bear part of the trailer's weight, as well as features adapted to dampen forces on the connection between the trailer and the towing vehicle, and is particularly useful for towing large trailers containing heavy loads.

Trailers are generally connected to trailer hitches which are mounted either to the bumper of a towing vehicle or, in the case of large trailers, to the towing vehicle's frame. A typical trailer has a forwardly-extending element called the trailer tongue. The vehicle trailer hitch is adapted to mate with a latching component which is mounted either on the trailer tongue or on a drawbar connecting the hitch to the trailer tongue.

Ideally, a trailer would incorporate two or more axles, spaced widely apart, which would support the mass of the trailer, and any cargo. Such is the case when a car is towed by another vehicle equipped with a two bar. The car's two axles support the mass of the car, while its freely steerable front axle turns the car with the towing vehicle. Similarly, for trailers with widely spaced apart multiple axles, the front axle must be either freely steerable, or coupled to the towing vehicle's steering system. However, both alternatives are impractical in most cases. As a result, a typical trailer contains either a single axle, or multiple axles mounted in close proximity.

If the trailer axle or axles are mounted adjacent the rear of the trailer, the distance between the trailer axle(s) and the trailer hitch is relatively large, producing a large load on the rear axle of the towing vehicle. As a consequence, a towing vehicle may have sufficient horsepower to pull a heavy load in a trailer of this type, but will be unable to support the large mass bearing down on towing vehicle's rear axle. To counteract this problem, some trailer manufacturers place the axle(s) near the center of the trailer. However, this requires a careful balancing of the initial load in the trailer, and a constant re-balancing as items are removed from and added to the trailer. Moreover, a center-axle trailer which has been designed to carry a certain load (for example, a single heavy object) may be unsuitable for other purposes.

Placing the axle of a trailer near the trailer's center causes another problem. As a trailer is being towed, it will bounce and pitch forward and back due to imperfections and changes in the road. Any such motion of the trailer will be transmitted to the towing vehicle, and a corresponding load transferred to the trailer hitch. With the trailer's center of gravity near a pivot point (the axle), the pitching motion can become severe, causing excessive loading of the hitch, excessive wear of the hitch ball, and an uncomfortable (and potentially dangerous) ride in the towing vehicle.

B. Related Prior Art

The problem of counteracting the forces generated by a towed trailer has been recognized in the art. For example, Hensley U.S. Pat. No. 5,660,409 is directed to a trailer hitch assembly which is adapted to limit swaying (fishtailing) by incorporating a link mechanism which dampens sideways movement. Lewis U.S. Pat. No. 3,756,618 employs pistons which connect the trailer tongue to lever arms in order to dampen sideways movement. However, neither of these references suggests a solution to the problem of handling excessive weight on the trailer hitch.

U.S. Pat. Nos. 5,785,330 and 5,823,558, both to Shoquist, are also of interest to the background of the present invention. Both patents are directed to apparatus for relieving the load imposed on the hitch of a towing vehicle by providing adjustable wheel assemblies to handle a portion of the weight of the trailer which would otherwise bear on the towing vehicle's rear axle. In both Shoquist patents, the wheel assemblies are supported by a superstructure which is mounted to a rigid trailer frame. The superstructures contain sleeves which serve as spindle mounts for a vertically-extending spindle to which wheels are attached. The spindles are equipped with either compression springs or air-bag pistons to dampen up and down movement of the trailer during towing.

The apparatus disclosed in the Shoquist '330 patent incorporates steering dampers in the form of hydraulic cylinders to control the turning motion of the wheel assembly when the trailer is turning. In one embodiment illustrated in the Shoquist '558 patent, the wheel assembly is adapted to be manually retractable in order to facilitate movement of the trailer in reverse.

Both Shoquist patents disclose features for adjusting the relationship between the spindle-holding superstructure and the trailer frame to accommodate the particular size and weight of the trailer and its load. Once this adjustment is made, the superstructure and the trailer frame are bolted together to form a rigid structure, locking the wheel in place. In addition to bearing the weight of the trailer's front end, the spring or air-biased Shoquist wheel assemblies function to dampen some of the up-and-down movement of the trailer with respect to the towing vehicle.

One limitation of the Shoquist designs is that the wheel assemblies only accommodate a portion of the static load bearing down on the towing vehicle. Shoquist's springs are set to support a certain amount of load, with the remainder being supported by the towing vehicle's hitch. The spring must be re-set every time the cargo in the trailer changes.

During actual operating conditions, while the trailer is pitching forward and back, a dynamic load is introduced. When the trailer is pitching forward, the trailer tongue will bear down harder on the tow vehicle, causing the spring to push up harder and absorb some of the additional load. When the reverse occurs, the trailer tongue tends to pull up on the hitch ball. The wheel assembly spindle spring is also pushing up on the tongue. These two forces are additive, so that upward force on the trailer hitch will actually increase during the upwards cycle. Because hitch/ball assemblies utilized to couple trailers to towing vehicles are primarily designed to support downward loads, this result is not desirable.

Similar problems occur while driving over a raised center median, a speed bump, an entrance ramp to a gas station, or other similar obstacles. The wheel assemblies employed in the Shoquist devices will pass over such an obstacle and be pushed up while the rear of the towing vehicle is dropping down over the other side of the obstacle. Again, the result is the spindle spring adding to the upward force generated by the trailer pitching back while the rear of the towing vehicle is trying to move downward. In the extreme (as in the case where most of the travel in the spring has been taken up to accommodate a particularly heavy trailer), the wheel assembly may not have enough travel to clear the obstacle. This creates a situation where the entire weight of the trailer can be cantilevered off of the trailer tongue. As a consequence, the towing assemblies depicted in the '330 and '558 patents do not provide a total solution to the trailer-towing problem.

SUMMARY OF THE INVENTION

The present invention provides towing apparatus which can be mounted between a trailer and a towing vehicle. The apparatus is adapted both to support the major part of the load which would otherwise bear down on the rear axle of the towing vehicle, and to absorb forces generated by relative movement of the towing vehicle and the trailer with respect to one another as the result of travel across hills and uneven surfaces.

The towing apparatus incorporates a trailer frame which is firmly secured to a towed vehicle or trailer. The trailer frame, manufactured of steel or aluminum, has a first, rear frame portion which typically comprises a framework of multiple beams which are adapted to be bolted or welded to the bottom of the trailer body. However, for small trailers containing light loads, a single rear frame beam could be used. Moreover, the trailer rear frame could be attached to the rear and/or sides of the trailer body, rather than to the trailer's bottom.

Extending frontwardly from the towing apparatus (i.e., in the direction of the towing vehicle), is a second portion of the trailer frame. This frontwardly-extending trailer frame portion contains outwardly-extending frame members which are adapted to support elements of the towing apparatus. The frame members which form the frontwardly-extending frame portion are integral with the trailer frame—welded, bolted or otherwise secured so that the rear frame portion and the members of the frontwardly-extending frame portion form a rigid, monolithic structure.

At the center of the frontwardly-extending frame is a main frame assembly, generally in the form of a box-like structure. For towing apparatus designed to for lighter vehicles, the trailer main frame assembly could be formed from a single frame member.

The top of a downwardly-depending, adjustable main spring is mounted adjacent to the top of the main frame assembly. The bottom of the trailer main spring, in turn, is connected to a bottom link assembly, the rear end of which is pivotally connected to the trailer frame at a point or points adjacent to the juncture of the rear frame portion with the frontwardly-extending frame portion (i.e., at a location on the trailer frame which is close to the trailer body). The tension on the main spring is adjustable—use of an air spring whose downward force is continuously adjustable over wide limits is especially preferred. When the main air spring is pressurized, the main spring urges the bottom link assembly in a downward direction, and upward movement of the bottom link assembly around the pivot point is constrained.

The apparatus of the present invention incorporates a retractable wheel assembly, comprising a main spindle. In a preferred embodiment, a pair of wheels is mounted to the bottom end of the wheel spindle, via a wheel axle, although for lighter loads a single wheel could be employed. While the wheel assembly is rotatable along an axis parallel to the main spindle, it is desirable to limit the rotation of the wheel assembly with steering stabilizers.

The wheel assembly spindle is interconnected with the front end of the pivotally-mounted bottom link assembly. Because the bottom link assembly is also connected to both the trailer main frame and the main spring, the weight of the trailer front end is transferred to the wheel assembly. By regulating the pressure in the main spring, it is comparatively easy to adjust the amount of load on the towing vehicle's trailer hitch. The main spring likewise buffers up and down movement of the wheel assembly during travel.

In a preferred embodiment, the frontwardly-extending trailer frame portion also includes an outermost pair of spaced-apart elements which extend upwardly at an angle of about 30° with the horizontal. These outermost members, integral with the trailer frame, are adapted to support adjustable secondary springs. In the case of smaller loads, a single secondary-spring-supporting element, located near the center of the main frame, could be used.

The towing apparatus includes a trailer tongue—a forwardly-extending mechanism for connecting the trailer to the towing vehicle via a trailer coupling. In a preferred embodiment, the trailer tongue is a wishbone-shaped structure which is joined to the base of the frontwardly-extending trailer frame portion at two places. Unlike conventional trailer tongues, the trailer tongue of the present invention is pivotally-mounted to the trailer frame, rather than being integral with the trailer frame structure. This is accomplished by providing spring-receiving regions on the trailer tongue, underneath the secondary-spring-supporting elements. Adjustable springs are mounted between the trailer tongue and the secondary-spring-supporting elements; these secondary springs are capable of supporting the weight of the trailer and of holding the trailer tongue in a generally-horizontal position, despite the pivotal mounting of the tongue to the trailer frame. As is the case with the main spring, these secondary springs are preferably air springs whose downward bias can be continuously adjusted. With embodiments of the towing apparatus adapted for smaller trailers, the trailer tongue could be pivotally joined to the trailer frame at a single point, and a single secondary spring could be used to maintain the tongue in horizontal position.

With the towing apparatus wheel assembly in the normal, wheel-down position, the bulk of the trailer's load will be borne by the main spring, and the secondary spring or springs are not fully pressurized. This permits limited up and down movement of the pivotally-mounted trailer tongue, at its connection with the trailer frame, with the secondary springs functioning as shock absorbers.

Because the secondary air springs impart a downward force on the trailer tongue, the hitch and the towing vehicle can never experience an upward load from the trailer. If the trailer is pitching back while the rear of the towing vehicle is moving downward, the tongue will continue to impart a downward force on the hitch. The amount of this downward force can be controlled by regulating the amount of pressure on the secondary springs and, once set, will not have to be adjusted. Thus, the hitch on the towing vehicle will experience a near-constant downward force regardless of how heavy the trailer is, how well the trailer's cargo has been balanced, how the trailer is pitching forward and back.

With the wheel assembly in the up position, the secondary springs are required to bear the weight of the trailer front end and to maintain the tongue in the horizontal position. To accomplish this, the preferred embodiment of the towing apparatus contains a mechanism which is adapted to increase the pressure in the secondary springs as the wheel assembly is being raised.

As mentioned previously, the bottom link assembly which supports both the wheel assembly and the base of the main spring is pivotally attached to the trailer frame at a location which is adjacent to the trailer body. In a preferred embodiment, a pair of pneumatic lift cylinders are also connected to the trailer frame, beneath the bottom surface of the bottom link assembly. When air pressure is removed from the main spring and supplied to these lift cylinders, the pistons of the lift cylinders urge the bottom link assembly in an upward direction, causing the wheel assembly to retract, and moving the wheel or wheels of the towing apparatus out of contact with the road. Retracting the wheels in this manner is generally desirable when backing up.

In a preferred embodiment, the towing apparatus incorporates a top link assembly mounted above the wheel assembly. The top link assembly comprises a rigid frame, the rear of which is pivotally attached to the main frame assembly. The front of the top link assembly is pivotally attached to a carrier bar which is pivotally connected to the wheel assembly spindle. The top link assembly facilitates lifting of the wheel assembly, as well as providing rigidity to the interconnection of the wheel assembly and the bottom link assembly.

In an especially preferred embodiment, the towing apparatus incorporates load leveling features which are designed to automatically compensate for the mass of the trailer by increasing or decreasing the pressure in the main and secondary air springs until the trailer tongue is level (substantially horizontal). The preferred apparatus also includes shock absorbers mounted between the main frame member and the bottom link assembly to further dampen unwanted movement.

The preferred embodiment also incorporates features to automatically raise and lower the wheel assembly. For example, a relay responsive to activation of the towing vehicle's back up lights can be used to adjust the air pressure in the main and secondary springs, as well as to activate the lift cylinders adapted to lift the wheel assembly. On receipt of such a signal, the pressure on the main spring would be lowered and the pressure in the side springs raised to accommodate the weight of the trailer. Simultaneously, the pistons of the lift cylinders would gradually extend, lifting the wheel assembly from contact with the ground surface. Shifting the towing vehicle to a forward gear would reverse this process.

Electric power for the lifting system is typically supplied by the towing vehicle's electrical system. In the preferred embodiment, a source of compressed air is also required. A compressor can be installed on the towing vehicle, or on the trailer if such a compressor is not already present.

BRIEF DESCRIPTION OF THE DRAWINGS

These and other features and advantages of the present invention will become more apparent from a detailed consideration of the invention when taken in conjunction with the drawings in which.

DETAILED DESCRIPTION OF A PREFERRED EMBODIMENT

Figure 1:
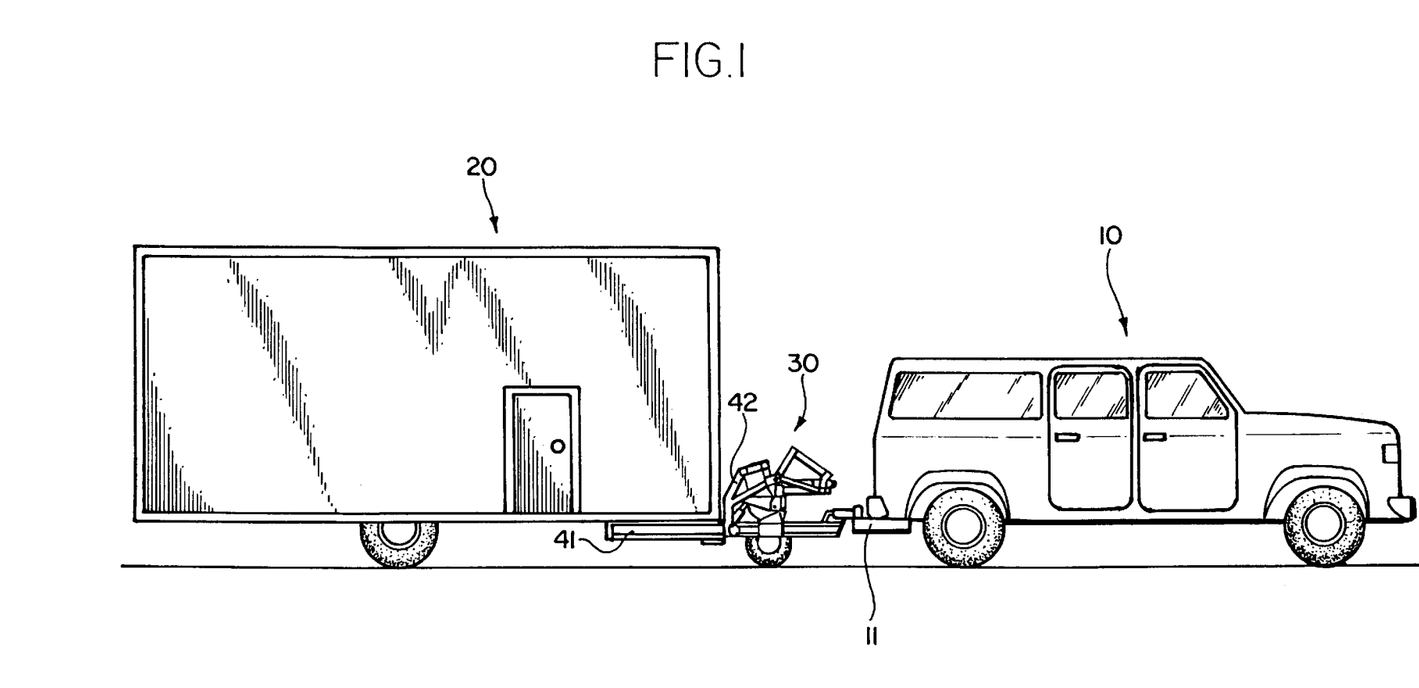
FIG. 1 is an elevational view showing a towing vehicle connected to a trailer which is equipped with towing apparatus in accordance with the present invention.

FIG. 1 depicts a towing vehicle 10 attached to a trailer 20 which is equipped with a towing apparatus 30 in accordance with the present invention.

Figure 2:
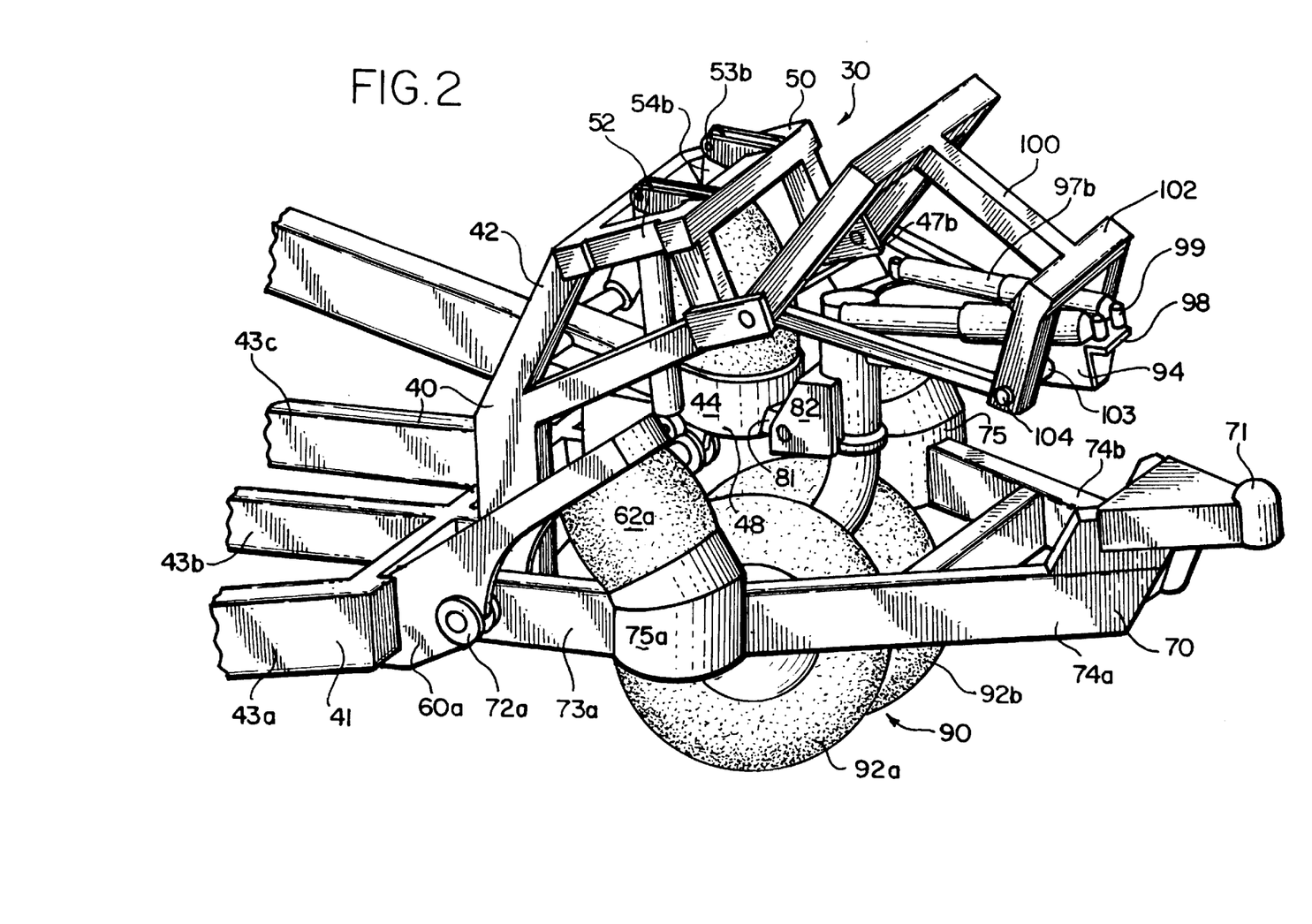
FIG. 2 is a perspective view of towing apparatus in accordance with the present invention with the wheel assembly in the down position.
Figure 3:
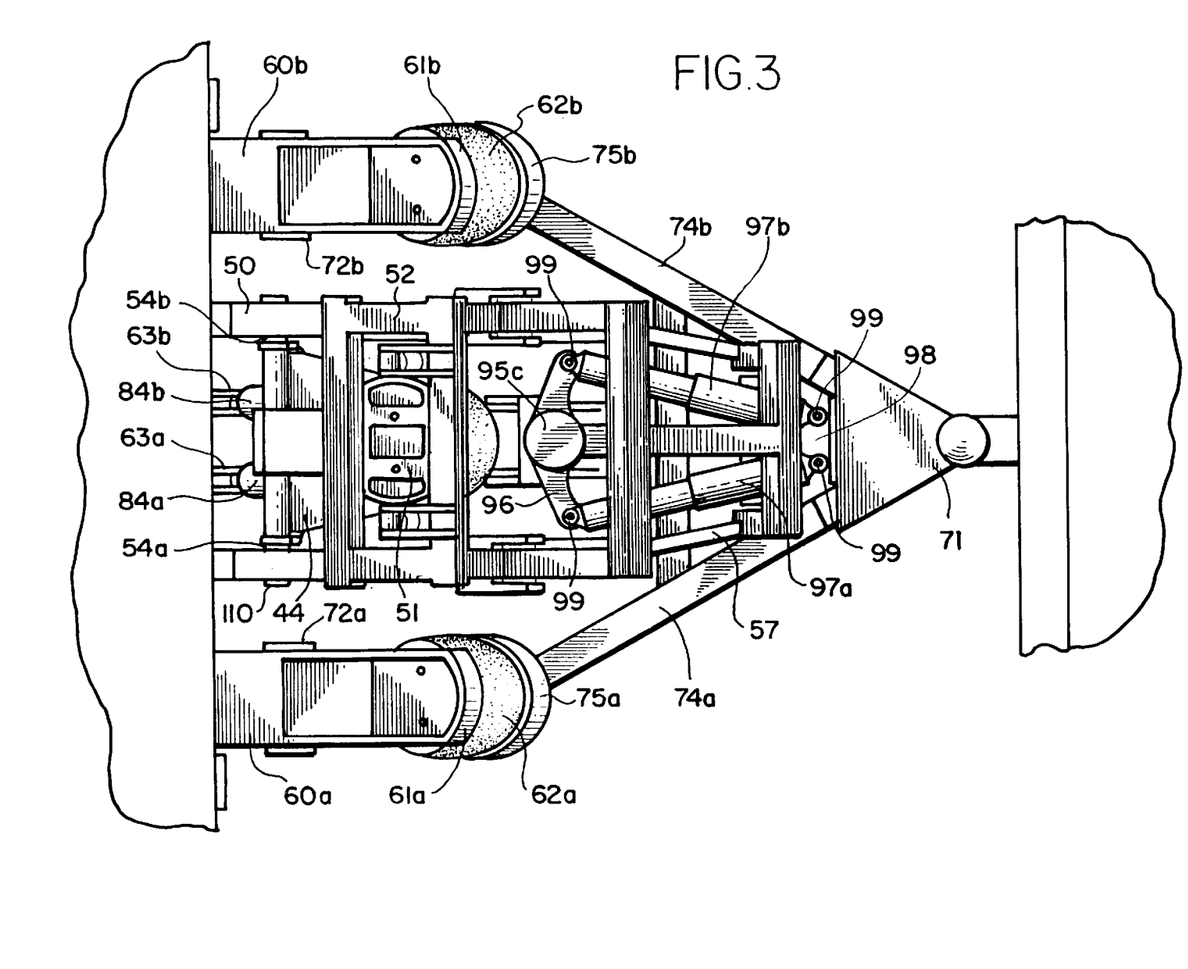
FIG. 3 is a plan view of the towing apparatus.
Figure 4:
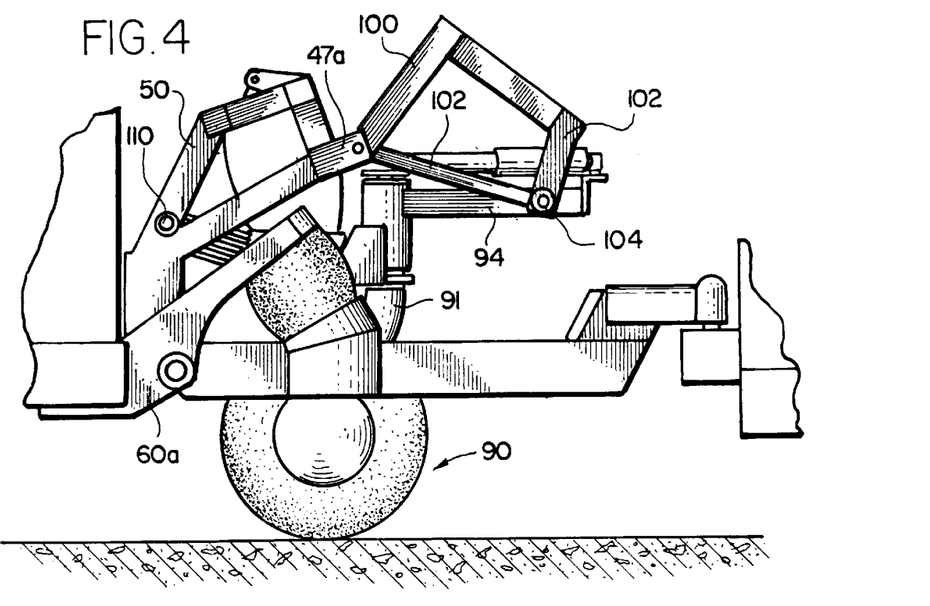
FIG. 4 is a side elevational view of the towing apparatus with the wheel assembly in the down position.

FIGS. 2 & 3 illustrate the major components of towing apparatus 30. The main structural element of towing apparatus 30 is a trailer frame 40 which has a rear frame portion 41 comprising rear beams 43a, 43b, 43c, and 43d which are adapted to be mounted to the bottom of trailer 20 (FIG. 1) by bolts, welding or the like. Projecting outwardly from trailer frame 40 (i.e., in the direction of towing vehicle 10), is a frontwardly-extending trailer frame portion 42 which is integral with trailer frame 40.

Extending from the center of trailer frame portion 42 is a box-like main frame assembly 50; similarly, a pair of secondary-spring-supporting frame members 60a, 60b extend outwardly from each side of frame portion 42 (FIG. 3). Main frame assembly 50 and supporting frame members 60a, 60b are integral with trailer front frame portion 42.

Figure 8:
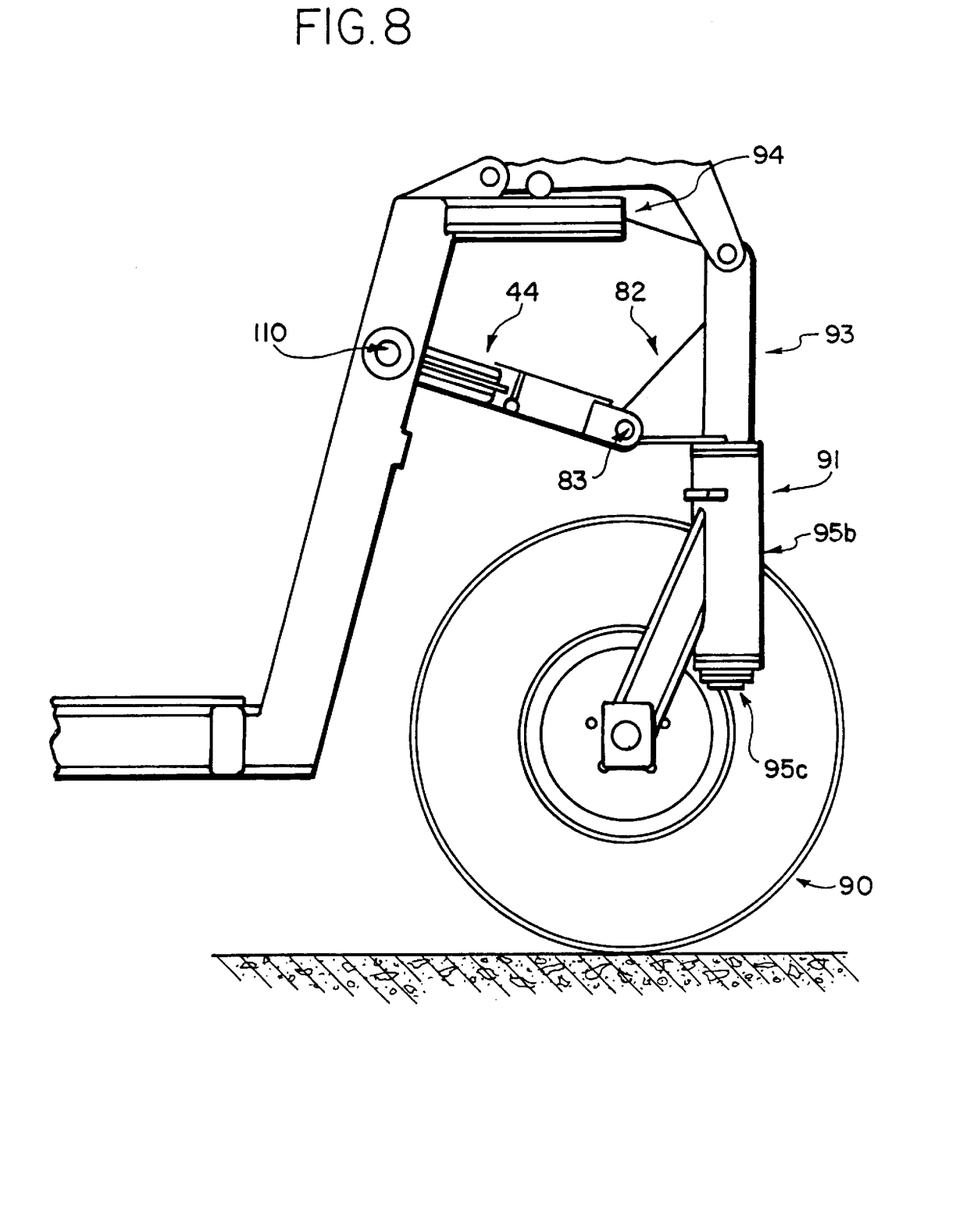
FIG. 8 is a side elevational view of one embodiment of the wheel assembly and the carrier link assembly employed in the towing apparatus.

Main frame assembly 50 supports a main spring 80 which is connected to a bottom link assembly 44 (FIG. 8). Bottom link assembly 44, in turn, is interconnected with a retractable wheel assembly 90. In addition to spring 80, main frame assembly 50 supports a top idler link assembly 100 which is also interconnected with wheel assembly 90. Thus, most of the elements of towing apparatus 30 are supported through direct or indirect connection to main frame assembly 50.

One major component of towing apparatus 30 which is not supported by assembly 50 is the trailer tongue 70. Tongue 70 is a wishbone-shaped structure which has a pair of rearwardly-extending legs 74a, 74b. Tongue legs 74a, 74b each have a rear end element 73a, 73b, respectively. Pivotal connectors in elements 73a, 73b allow tongue 70 to be pivotally attached to trailer frame 40 by fittings 72a, 72b. The pivotal connectors in elements 73a, 73b may comprise pins, and fittings 72a, 72b may comprise bushings, thus forming a pin in a bushing connection. A trailer hitch coupling 71 is mounted to the tongue's front end (i.e., at a region on tongue 70 which is opposite, or distal, from rear elements 73a, 73b). Coupling 71 is adapted to mate with a trailer hitch 11 on towing vehicle 10 (FIG. 1). Mounted to each tongue leg 74a, 74b are circular support plates 75a, 75b.

As mentioned above, a pair of secondary-spring-supporting members 60*a*, 60*b* extend outwardly from the periphery of frame 42. Spring-supporting members 60*a*, 60*b* terminate in spring support areas 61*a*, 61*b*, connected, respectively, to secondary springs 62*a*, 62*b*. Secondary springs 62*a*, 62*b* are also connected to trailer tongue support plates 75*a*, 75*b*. Springs 62*a*, 62*b* are air springs which are connected to a source of pressurized air (not shown). When pressurized air is introduced into springs 62*a*, 62*b*, the springs will expand, and downward force will be exerted on tongue 70, overcoming the tendency for tongue 70 to pivot upwards at its connection to frame 40 through fittings 72*a*, 72*b*.

Main frame assembly 50 is a generally box-like structure which is formed from metal bars welded together to form a rigid frame. A main-spring supporting plate 51 (FIG. 3) is suspended from the top or roof 52 of assembly 50. Attached to plate 51, within frame assembly 50, is main spring 80 which, like secondary springs 62*a* and 62*b*, is an air spring connected to a source of pressurized air. The base of main spring 80 is attached to a cylindrical support 48 (FIG. 11) on bottom link assembly 44. A rear bolt 110 passes through a rear bolt sleeve 49 of bottom link assembly 44 and rear slots 54*a*, 54*b* in main frame assembly 50 (FIG. 3), pivotally connecting link assembly 44 to the main frame assembly 50. As a result of this construction, when pressurized air is introduced into main spring 80, downward force is brought to bear on bottom link assembly 44, inhibiting the upward movement of the link assembly, around its pivotal connection to main frame assembly 50.

Figure 6:
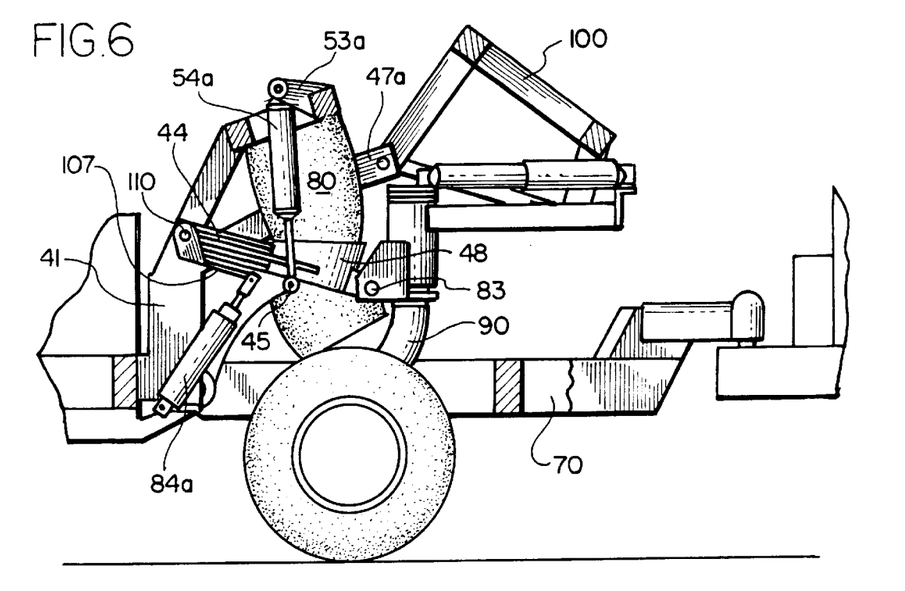
FIG. 6 is a side elevational view, similar to FIG. 4, but with portions of the structure removed to show the relationship of the central components of the towing when the wheel assembly is in the down position.
Figure 7:
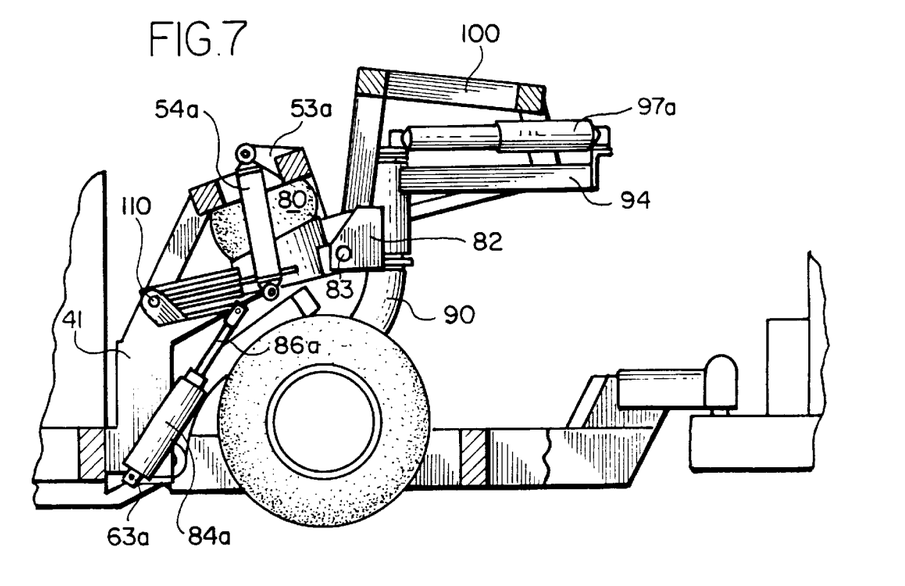
FIG. 7 is a side elevational view, similar to FIG. 5, but with portions of the structure removed to show the relationship of the central components of the towing when the wheel assembly is in the up position.
Figure 11:
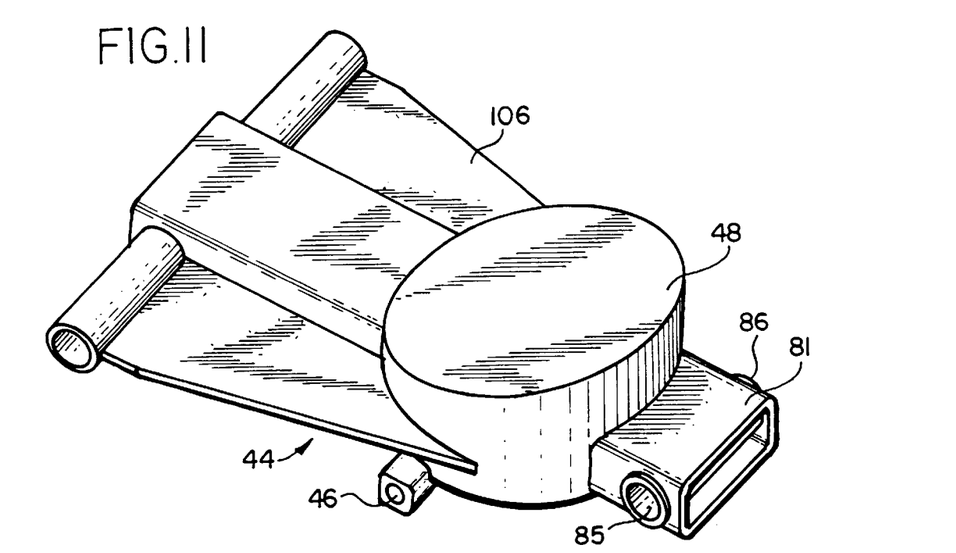
FIG. 11 is a perspective view of the bottom link assembly employed in at the towing apparatus.

Extending downwardly from main frame roof 50 are two shock absorber supports 53*a*, 53*b* (FIGS. 2, 6 & 7). The cylinders of a pair of shock absorbers 54*a*, 54*b* are suspended from supports 53*a*, 53*b*; the pistons of the shock absorbers are connected to bottom link assembly 44 by a piston bolt 45 which passes through a center bolt sleeve 46 on bottom link assembly 44 (FIGS. 6, 7 & 11). This interconnection permits shock absorbers 54*a*, 54*b* to dampen movement of bottom link assembly 44.

Extending forwardly from main frame assembly 50 are a pair of top link assembly support brackets 47*a*, 47*b* which allow top idler link assembly 100 to be pivotally connected to main frame assembly 50 by a rear idler pivot pin 101.

Figure 9:
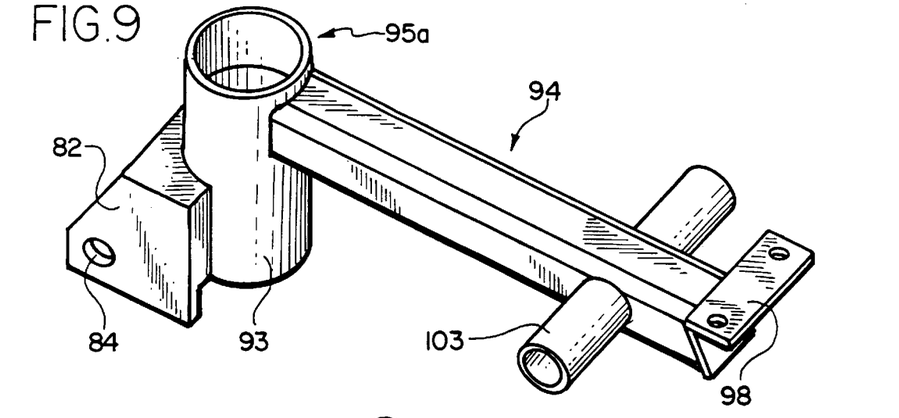
FIG. 9 is a perspective view of the carrier link of FIG. 2.
Figure 10:
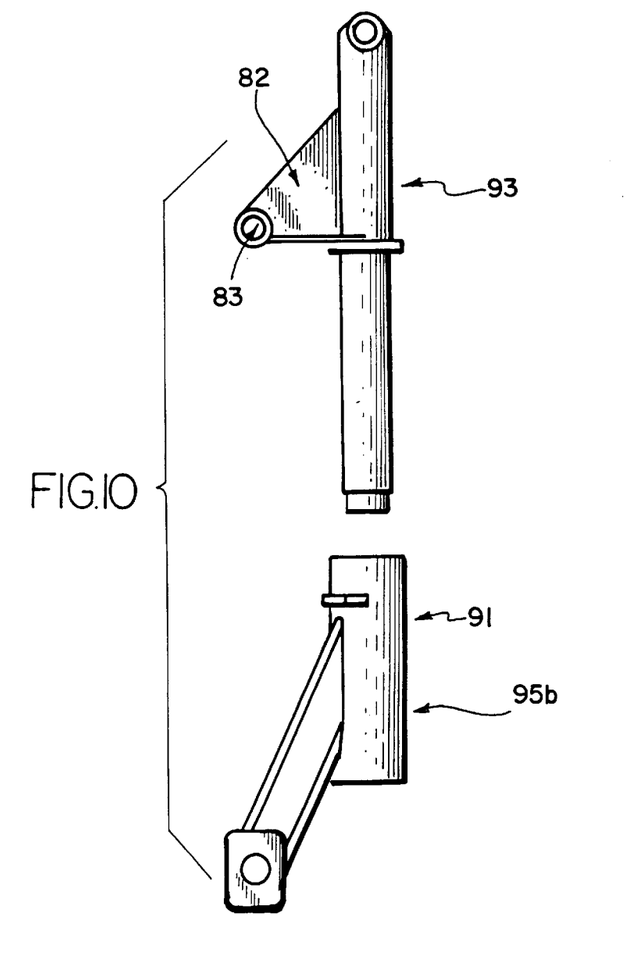
FIG. 10 is an exploded view of a wheel spindle and a carrier bar employed in one embodiment of the present invention.

Retractable wheel assembly 90 comprises a spindle 91 which has a pair of wheels 92*a*, 92*b* attached at the spindle bottom. The wheel spindle 91 may be attached to the carrier bar 93 in either of two ways. The carrier bar 93 may comprise a spindle sleeve 95*a*, wherein the wheel spindle 91 is journaled in the spindle sleeve 95*a* (FIGS. 2, 3 & 9). Alternatively, the wheel spindle may comprise a sleeve 95*b* wherein the carrier bar 93 is journaled in the sleeve 95*b* (FIGS. 8 & 10). A spindle cap 95*c* covers the end of the spindle 91. The carrier bar 93 is part of the carrier link assembly 94. A steering stabilizer bracket 96 is secured to the top of the carrier bar 93 (FIGS. 2 & 3). A pair of steering stabilizer pistons 97*a*, 97*b* are attached between stabilizer bracket 96 and a flange 98 of carrier link assembly 94 by pins 99. Steering stabilizers 97*a*, 97*b* dampen the movement of spindle 91, and thus control any tendency of wheels 92*a*, 92*b* to shimmy when wheel assembly 90 is in the down position and the wheels are in contact with the road.

Retractable wheel assembly 90 is operatively connected to main spring 80 by joining bottom link assembly 44 (FIG. 11) to carrier link assembly 94 (FIG. 8). Referring now to FIGS. 2, 9 & 11, a front section 81 of bottom link assembly 44 fits within a rear section 82 of carrier link assembly 94. An elongated bolt 83 passes through holes 84, 85, 86 & 87 (the latter not shown) in link assemblies 44 and 94, connecting the two link assemblies together, but permitting wheel assembly 90 to rotate upward around the pivot arm defined by bolt 83 when retraction of the wheel assembly is desired.

Because bottom link assembly 44 is connected to main spring 80, the mass of trailer 20 which would otherwise be borne by the towing vehicle's trailer hitch 11 can be transferred to wheel assembly 90. By adjusting the bias of main spring 80, the ratio of the mass born by wheel assembly 90 and the mass borne by trailer hitch 11 can be controlled, so that only a small portion of the trailer's mass is transferred to the trailer hitch.

Figure 5:
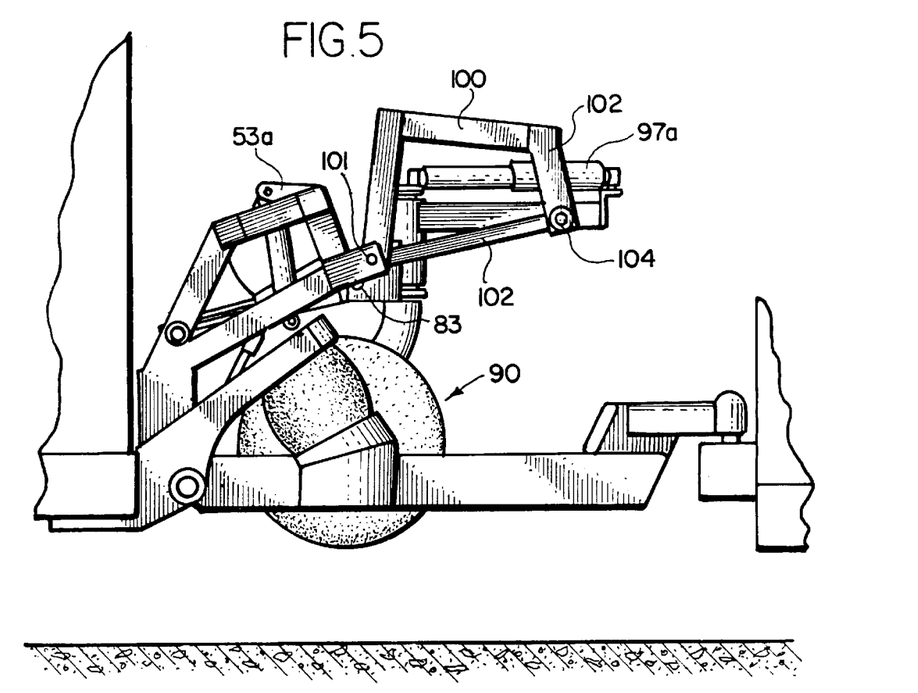
FIG. 5 is a side elevational view of the towing apparatus with the wheel assembly in the up position.

Wheel assembly 90 is retractable—i.e., movable from a normally downward position, as shown in FIGS. 2–4 & 6, to a wheel-up position as shown in FIGS. 5 & 7. Movement of the wheel assembly is facilitated by top idler link assembly 100, pivotally connected to main frame assembly 50 at previously-described support brackets 47*a*, 47*b*. Like main fame assembly 50, top idler link assembly 100 is a generally box-like structure formed from metal bars. The front end 102 of assembly 100 is pivotally attached to a front end mounting 103 of carrier assembly 94 by a front idler pivot pin 104 FIGS. 2, 4 & 9). As a consequence of its pivotal connection to towing apparatus 30 at two locations (pins 101 & 104), idler link assembly 100 will move from the position shown in FIGS. 4 & 6 to the position shown in FIGS. 5 & 7 when wheel assembly 90 is retracted.

Figure 12:
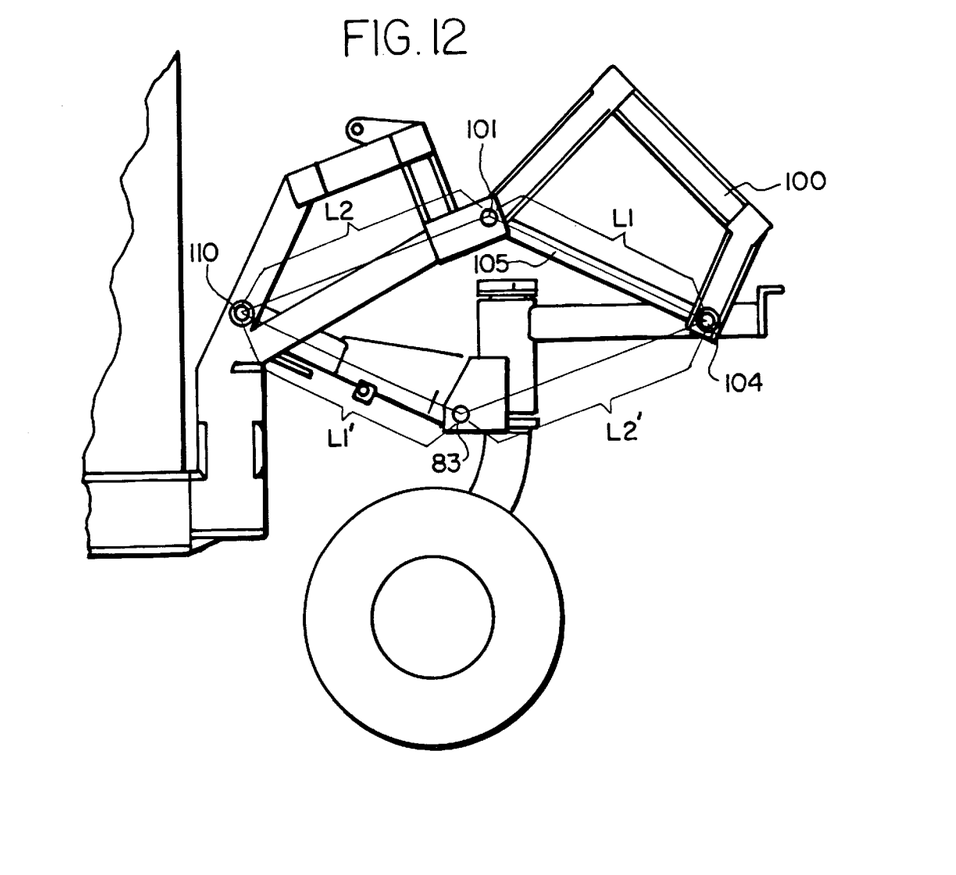
FIG. 12 is a side elevational view showing the geometric relationship of elements of the towing apparatus of the present invention.

Referring now to FIG. 12, in addition to facilitating the raising and lowering of wheel assembly 90, top idler link assembly 100 serves to hold wheel assembly in place when it is in the downward position. Idler link assembly 100 has a bottom member 105, whose length is substantially identical to that of bottom link assembly 44. Thus, the distance between idler pivot pins 101 and 104 is substantially identical to the distance between rear bottom link bolt 110 and elongated bolt 83, which pivotally interconnects bottom link assembly 44 to carrier link assembly 94; that is, the two lengths "L1" and "L1'" are substantially the same. By the same token, the distance between bottom link bolt 110 and link assembly rear pivot pin 101 is substantially the same as the distance between elongated bolt 83 and link assembly front pivot pin 104; that is the two lengths "L2" and "L2'" are substantially the same. As a result, despite the fact that bottom link assembly 44 and carrier link assembly 94 are interconnected through a pivot, the regular parallelopiped, defined by parallelograms L1, L2', L1' & L2 on both sides of the towing apparatus 30, holds wheel assembly 90 in the downward position.

Figure 13:
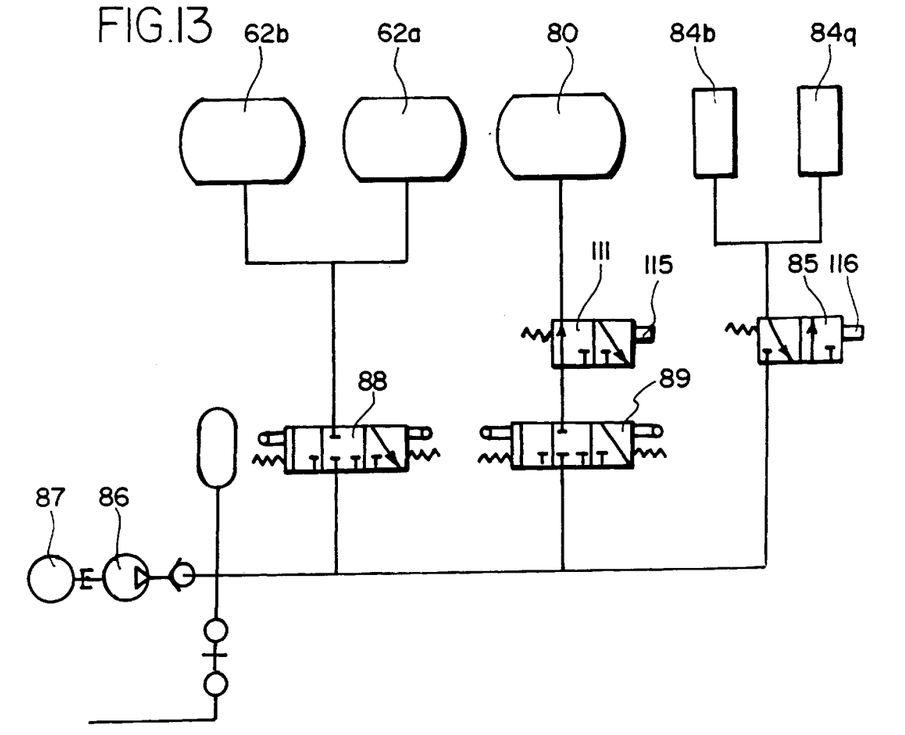
FIG. 13 is a schematic depicting the air connections to the towing apparatus of FIGS. 1 through 7.

The mechanism for moving wheel assembly 90 from a wheels-down position to a wheels-up, retracted position can be best understood by reference to FIGS. 3, 6, 7, 11 & 13. A pair of hydraulic cylinder support brackets 63*a*, 63*b* extend backwardly from the bottom of rear trailer frame portion 41. Mounted to brackets 63*a*, 63*b* are two hydraulic lift cylinders 84*a*, 84*b* which are connected to an air compressor 86 through a solenoid-activated lift cylinder valve 85 (FIG. 13). Lift cylinders 84*a*, 84*b* have lift pistons 86*a*, 86*b* (the latter not shown) extending outwardly therefrom. Bottom link assembly 44 has top and bottom rear surfaces 106, 107 between rear sleeve 49 and center sleeve 46. When compressed air is supplied to pneumratic cylinders 84*a*, 84*b*, lift pistons 86*a*, 86*b* are adapted to bear against bottom surface 107, urging bottom link assembly 44 upwardly around link bolt 110. Because wheel assembly 90 is interconnected to bottom link assembly 44, when lift pistons 86*a*, 86b are in the filly-extended position, wheel assembly 90 will be raised to the position shown in FIGS. 5 & 7.

FIG. 13 schematically depicts the air connections to components of towing apparatus 30 in a preferred embodiment. A motor 87 powers air compressor 86 which supplies compressed air to main air spring 80 through a mechanically actuated, 3-position, pneumatic first ride-leveling valve 89. Valve 89 is mounted on the main frame 50 or some other structure which is rigidly attached to the trailer. Valve 89 has a mechanical actuator which is attached through a linkage to retractable wheel assembly 90 or to bottom link 44 such that valve 89 is in its center (or closed) position when the trailer is at the desired ride height. A 2-position, solenoid actuated, spring return, pneumatic valve 111 is connected between second ride-leveling valve 89 and main air spring 80.

Similarly, air is supplied to secondary air springs 62a, 62b, through a second ride-leveling valve 88 which is substantially identical to valve 89. Valve 88 is similarly mounted to one of the secondary spring supporting members 60a, 60b, or some other structure which is rigidly attached to the trailer. Like valve 89, the mechanical actuator of valve 88 is attached through a linkage to tongue 70, such that valve 88 is in its center (closed) position when tongue 70 is in a substantially horizontal position.

Alternately, the actuating linkages for valves 88 and 89 can be adjusted to achieve a desired load on tongue 70.

Alternatively, a pressure reducing valve can be installed before valve 88 to ensure that the load on tongue 70 does not exceed a certain value, with the remainder of the load being carried by wheel assembly 90.

Figure 14:
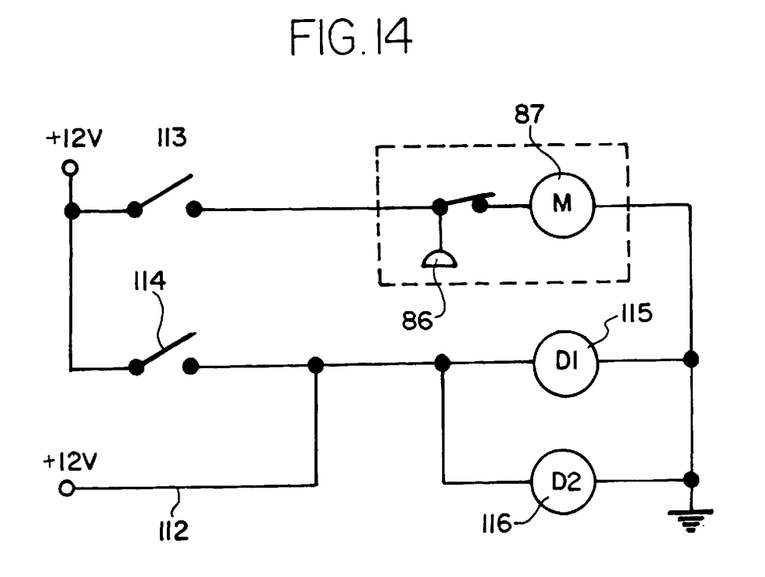
FIG. 14 is a schematic of the electrical connections between the towing vehicle and the motor powering the source of air illustrated in FIG. 13.

FIG. 14 schematically depicts the electric circuitry used to activate lift cylinder valve 85 to move wheel assembly 90 to the raised, wheel-up position. Solenoids 115 and 116, which actuate valves 111 and 85, respectively, are energized by a signal from the backup lights of towing vehicle 10 through an electrical lead 112, or by some other voltage source, through single-pole-single-throw (SPST) switch 114.

During normal operation, switch 114 is open, leaving solenoids 115 and 116 de-energized, and corresponding pneumatic valves 111 and 85 in the spring-returned position. Valve 85 releases any air in lift cylinders 84a, 84b, thereby keeping the lifting mechanism retracted. First, ride-leveling valve 89, with valve 111 in the de-energized state, will maintain the pre-set ride height of the trailer by either supply more air to, or releasing excess air from, the main air spring 80. Second, leveling valve 88, in turn, will similarly keep tongue 70 in a substantially horizontal position by supplying more air to, or releasing excess air from, secondary air springs 62a, 62b.

To back the towing vehicle up with the trailer attached, wheel assembly 90 must be retracted. A signal from the back-up lights of the tow vehicle will energize solenoids 115 and 116, activating valves 111 and 85 respectively. Manually activating switch 114 will achieve the same result. Valve 111, when activated, will release the air from main air spring 80, while shutting off the air supply through leveling valve 89. Valve 85, when activated, supplies air to lift cylinders 84a, 84b, causing them to extend.

With main air spring 80 deflated, lift cylinders 84a, 84b will cause the wheel assembly 90 to retract. As the wheel assembly is retracted, it no longer supports its portion of the trailer weight causing the trailer to lower. Second, ride-leveling valve 88 senses this, and supplies more air to secondary air springs 62a, 62b, thereby transmitting the weight to the tongue 70. With the wheel assembly retracted and the tongue restored to a substantially horizontal position, the trailer can be backed-up. The trailer can also be towed in the forward direction in this state, but the benefits of the wheel assembly are lost.

Shifting the towing vehicle out of reverse (or turning switch 112 off) will de-energize solenoids 115 and 116, thereby de-activating valves 111 and 85. De-activating valve 85 allows the air to escape from lift cylinders 84a, 84b, allowing the lifting mechanism to retract. De-activating valve 111 allows leveling valve 89 to again supply air to main air spring 80, causing the wheel assembly to extend and carry part of the weight of the trailer again. As the wheel assembly takes a portion of the load off of the tongue 70, leveling valve 88 will bleed off the excess air from secondary air springs 62a, b to maintain the correct positioning of the tongue 70.

While the present invention has been described with reference to a specific example, the example is intended to be illustrative only and not limiting of the invention. For example, a preferred embodiment employing air springs has been described. However, one could also utilize other forms of variable springs to accomplish the same end. It will be apparent to those of ordinary skill in the art that changes, additions and/or deletions may be made to the disclosed embodiment without departing from the spirit and scope of the invention.

What is claimed is:

1. Towing apparatus for connecting a trailer to a towing vehicle comprising:
    a) a trailer frame having a backwardly-extending rear frame portion for mounting the trailer frame to the trailer and a frontwardly-extending frame portion which is adapted to extend in the direction of the towing vehicle, said frontwardly-extending frame portion comprising:
        i) a main frame assembly, and
        ii) a secondary-spring-supporting frame member, said main frame assembly and said secondary-spring-supporting member integral with said trailer frame;
    b) a trailer tongue, having a trailer hitch coupling at one end for attaching the towing apparatus to the towing vehicle, and a pivotal connector at the other end for pivotally mounting the trailer tongue to the trailer frame;
    c) a wheel assembly having a top end and a bottom end, the top end comprising a wheel spindle, and the bottom end connected to a wheel;
    d) a bottom link assembly pivotally mounted to the trailer frame, a front end of the bottom link assembly operatively connected to said wheel assembly;
    e) an adjustable main spring depending from said main frame assembly and operatively connected to said bottom link assembly for biasing the bottom link assembly in a downward direction; and
    f) an adjustable secondary spring having a top end mounted to said secondary-spring-supporting frame member, and a bottom end of said secondary spring connected to the trailer tongue for urging said trailer tongue in a downward direction.

2. Towing apparatus in accordance with claim 1 wherein connection of said trailer tongue to the trailer frame comprises a pin in a bushing connection.

3. Towing apparatus in accordance with claim 1 wherein said frontwardly-extending frame portion includes a pair of spaced-apart tongue-supporting frame members, and said trailer tongue comprises a wishbone-shaped frame having first and second tongue frame elements, each frame element having a pivotal connector therein, and mounting apparatus for pivotally attaching said frame elements to said tongue-supporting frame members.

4. Towing apparatus in accordance with claim 3 wherein the frontwardly-extending frame portion includes a pair of spaced secondary-spring-supporting frame members, first and second springs mounted, respectively, to said secondary-spring-supporting frame members, a bottom portion of said first spring bearing against said first tongue frame element, and a bottom end of said second spring bearing against said second tongue frame element.

5. Towing apparatus in accordance with claim 1 wherein said wheel assembly is retractable.

6. Towing apparatus in accordance with claim 5, further including a carrier link assembly having a front portion and a rear portion, the front portion pivotally mounted to an idler frame assembly, and the rear portion attached to a carrier bar.

7. Towing apparatus in accordance with claim 6 wherein the carrier bar comprises a spindle sleeve.

8. Towing apparatus in accordance with claim 7 wherein said wheel spindle is journaled in the spindle sleeve.

9. Towing apparatus in accordance with claim 6 wherein the wheel spindle comprises a sleeve.

10. Towing apparatus in accordance with claim 9 wherein said carrier bar is journaled in the sleeve.

11. Towing apparatus in accordance with claim 1, further including a shock absorber mounted between said main frame assembly and said bottom link assembly.

12. Towing apparatus in accordance with claim 1 wherein said adjustable main spring and said adjustable secondary spring comprise air springs.

13. Towing apparatus for connecting a trailer to a towing vehicle comprising:
   a) a trailer frame having a backwardly-extending rear frame portion for mounting the trailer frame to the trailer and a frontwardly-extending frame portion which is adapted to extend in the direction of the towing vehicle, said frontwardly-extending frame portion comprising:
      i) a main frame assembly, and
      ii) a secondary-spring-supporting frame member, said main frame assembly and said secondary-spring-supporting member integral with said trailer frame;
   b) a trailer tongue, having a trailer hitch coupling at one end for attaching the towing apparatus to the towing vehicle, and a pivotal connector at the other end for pivotally mounting the trailer tongue to the trailer frame;
   c) a wheel assembly having a top end and a bottom end, the top end comprising a wheel spindle, and the bottom end connected to a wheel;
   d) a bottom link assembly pivotally mounted to the trailer frame, a front end of the bottom link assembly operatively connected to said retractable wheel assembly, and a lifting mechanism adapted to contact the bottom link assembly for raising and lowering said wheel assembly;
   e) an adjustable main spring depending from said main frame assembly and operatively connected to said bottom link assembly for biasing the bottom link assembly in a downward direction; and
   f) an adjustable secondary spring having a top end mounted to said secondary-spring-supporting frame member, and a bottom end of said secondary spring connected to the trailer tongue for urging said trailer tongue in a downward direction.

14. Towing apparatus for connecting a trailer to a towing vehicle comprising:
   a) a trailer frame having a backwardly-extending rear frame portion for mounting the trailer frame to the trailer and a frontwardly-extending frame portion which is adapted to extend in the direction of the towing vehicle, said frontwardly-extending frame portion comprising:
      i) a main frame assembly, and
      ii) a secondary-spring-supporting frame member, said main frame assembly and said secondary-spring-supporting member integral with said trailer frame;
   b) a wishbone-shaped trailer tongue having spaced-apart first and second tongue legs pivotally mounted to the trailer frame, having a trailer hitch coupling at one tongue end for attaching the towing apparatus to the towing vehicle, and a pivotal connector at the other end for pivotally mounting the trailer tongue to the trailer frame;
   c) a wheel assembly having a top end and a bottom end, the top end comprising a wheel spindle, and the bottom end connected to a wheel;
   d) a bottom link assembly pivotally mounted to the trailer frame, a front end of the bottom link assembly operatively connected to said retractable wheel assembly, and a lifting mechanism adapted to contact the bottom link assembly for raising and lowering said wheel assembly;
   e) an adjustable main spring depending from said main frame assembly and operatively connected to said bottom link assembly for biasing the bottom link assembly in a downward direction; and
   f) an adjustable secondary spring having a top end mounted to said secondary-spring-supporting frame member, and a bottom end of said secondary spring connected to the trailer tongue for urging said trailer tongue in a downward direction.

15. Towing apparatus for connecting a trailer to a towing vehicle comprising:
   a) a trailer frame having a backwardly-extending rear frame portion for mounting the trailer frame to the trailer and a frontwardly-extending frame portion which is adapted to extend in the direction of the towing vehicle, said frontwardly-extending frame portion comprising:
      i) a main frame assembly, and
      ii) a secondary-spring-supporting frame member, said main frame assembly and said secondary-spring-supporting member integral with said trailer frame;
   b) a wishbone-shaped trailer tongue having first and second tongue legs each pivotally connected to the trailer frame, and a trailer hitch coupling for attaching the towing apparatus to the towing vehicle;
   c) a wheel assembly having a top end and a bottom end, the top end comprising a wheel spindle, and the bottom end connected to a wheel;
   d) a bottom link assembly pivotally mounted to the trailer frame, a front end of the bottom link assembly operatively connected to said retractable wheel assembly, and a lifting mechanism adapted to contact the bottom link assembly for raising and lowering said wheel assembly;
   e) an adjustable main spring depending from said main frame assembly and operatively connected to said bottom link assembly for biasing the bottom link assembly in a downward direction; and f) a pair of adjustable secondary springs, each secondary spring having a top end mounted to said secondary-spring-supporting frame member and a bottom end, the bottom end of one said secondary spring operatively connected to the first tongue leg and the bottom end of the other secondary spring operatively connected to the second tongue for urging said trailer tongue in a downward direction.

16. In a trailer having load-dampening apparatus for controlling the load of the trailer on a trailer hitch, the improvement comprising:

a) a wishbone-shaped trailer tongue having spaced-apart first and second tongue legs, each leg pivotally mounted to said trailer, and a front end of the trailer tongue having a coupling for attachment to said trailer hitch;

b) a centrally-disposed main frame assembly trailer frame extending frontwardly from said trailer;

c) a pair of secondary-spring-supporting frame members extending frontwardly from said trailer, one on each side of said main frame member, the end of each frame member located above a trailer tongue leg;

d) first and second secondary springs mount at the end of each frame member, an end of said first spring in operative contact with said first tongue leg, and an end of said second spring in operative contact with said second tongue leg;

e) a retractable wheel assembly having a top end and a bottom end, the top end comprising a wheel spindle, and the bottom end connected to a wheel;

f) a bottom link assembly pivotally mounted to the trailer frame, a front end of the bottom link assembly operatively connected to said retractable wheel assembly, and a lifting mechanism adapted to contact the bottom link assembly for raising and lowering said wheel assembly;

g) an adjustable main spring depending from said main frame assembly and operatively connected to said bottom link assembly for biasing the bottom link assembly in a downward direction; and h) an adjustable secondary spring having a top end mounted to said secondary-spring-supporting frame member, and a bottom end of said secondary spring connected to the trailer tongue for urging said trailer tongue in a downward direction.

* * * * *